US010383289B2

(12) United States Patent
Lin et al.

(10) Patent No.: US 10,383,289 B2
(45) Date of Patent: Aug. 20, 2019

(54) COVERING AND METHOD FOR PROMOTING LOCAL RAINFALL

(71) Applicant: Pang-Yien Lin, Taichung (TW)

(72) Inventors: Pang-Yien Lin, Taichung (TW); Cheng-Jui Lin, Taichung (TW)

(73) Assignee: Pang-Yien Lin, Taichung (TW)

( * ) Notice: Subject to any disclaimer, the term of this patent is extended or adjusted under 35 U.S.C. 154(b) by 152 days.

(21) Appl. No.: 15/475,102

(22) Filed: Mar. 30, 2017

(65) Prior Publication Data

US 2017/0290276 A1    Oct. 12, 2017

(30) Foreign Application Priority Data

Apr. 11, 2016 (TW) .............................. 105111266 A (51) Int. Cl.
*A01G 15/00* (2006.01)
(52) U.S. Cl.
CPC .................................... *A01G 15/00* (2013.01)
(58) Field of Classification Search
CPC ...................................................... A01G 15/00
USPC .................. 239/2.1, 14.1; 126/625; 136/206
See application file for complete search history.

(56) References Cited

U.S. PATENT DOCUMENTS

2008/0115819 A1* 5/2008 Momii .................... F03D 9/007
136/206

FOREIGN PATENT DOCUMENTS

| CN | 1064781 | 9/1992 |
| CN | 102027869 | 4/2011 |
| CN | 104412875 | 3/2015 |
| CN | 104890829 | 9/2015 |
| JP | 2007-082408 | 4/2007 |
| JP | 2010-007047 | 1/2010 |

* cited by examiner

*Primary Examiner* — Darren W Gorman (57) ABSTRACT

Covering and method for promoting local rainfall are provided. The covering has a skin to cover a field that can get thermal energy. An edge part of the skin is installed at a surface of the field, and the inner part of the skin surrounded by the edge part can be lifted up from the surface to form a space to store air. The covered air receives thermal energy and the skin prevents air convection and reduces thermal energy loss, thereby generating a temperature difference between the inside and outside of the skin. By utilizing buoyancy resulted from the air temperature difference to lift up the inner part of the skin, a huge space is formed to contain a large amount of air. Thereafter, the covered air continues to receive thermal energy, causing huge thermal energy to be stored in the covered air, which is then used to promote rainfall.

9 Claims, 9 Drawing Sheets

801 — use one or a plurality of nearby coverings for promoting local rainfall to cover a field where can get thermal energy 802 — spread the skin of the covering on the surface of the field, manage to make a portion of the skin form a protruded part of an "initiating bulge", and by means of receiving thermal energy by the covered air to increase a temperature difference between the air inside and outside the skin, when the buoyancy at the protruded part is greater than the gravity of the corresponding part, the buoyancy starting to lift up the protruded part and to suck the outside air into the space below the covering 803 — receive thermal energy by the covered air continuously, thereby the protruded part continuing to be lifted up higher and wider, meanwhile the air outside the covering continuing to be sucked into the space below the covering until all of the liftable portion of the skin being lifted up to the heights pre-established by a plurality of respective anti-buoyancy pulling members, so that the space between the covering and the field is completely filled with "initial heated" air 804 — after the covering is completely filled with the "initial heat" air, receive thermal energy by the covered air further continuously, thereby the temperature of the covered air being raised, meanwhile the water contained in the field below the covering also receiving thermal energy and being evaporated into vapor with latent heat accumulates in the covered air, through a period of receiving thermal energy the covered air becomes "hot" air that is hot and humid 805 — after a huge amount of thermal energy is accumulated in the covered air, release the covered air to the lower atmosphere at a proper time thereby increasing the temperature and humidity of the lower atmosphere so as to increase the local atmospheric instability and promote the occurrence of small-scale cumulonimbus and rain

FIG. 8

COVERING AND METHOD FOR PROMOTING LOCAL RAINFALL

FIELD OF THE INVENTION

The present invention relates to structure and method for promoting local rainfall, and more particularly to covering and corresponding method for promoting local rainfall.

BACKGROUND OF THE INVENTION

In the prior art, hot air may be stored in a transparent covering such as a greenhouse. Specifically, sunlight emits into and heats the air inside the greenhouse, the inside air could not mingle with the outside air by the greenhouse, the temperature inside the greenhouse is higher than the temperature outside the greenhouse, and thermal energy is accumulated in the greenhouse. However, greenhouse is mainly constructed of members such as boards or beams for withstanding bending moment and walls or columns for withstanding the weights of the components, such a construction will have a larger sectional area and weight, and the sectional area increases along an increase in dimensions such as length, width, height, etc, as a result, it is difficult to produce this type of structure with a very large area and volume.

In the prior art, a large volume of air may be stored in a structure body such as a conventional pneumatic structure with a skin formed by air tight films and equipments such as blowers for providing pressure difference between two sides of the skin. Its pressure difference distribution is different from that caused by the buoyancy of hot air. In the latter case, the pressure difference between the inside and outside of the covering which is filled with hot air is about zero at the two sides near the air inlet and increases progressively from bottom to top of the covering. In the former case, the pressure difference between the inside and outside of the pneumatic structure does not vary with height. Therefore, the actions of structural mechanics on the two structure bodies are quite different. In the latter case, the pressure difference between the inside and outside on the lower portion of the skin is relatively small and a gap communicating the inside and outside of the skin may exist at the lowest portion of the skin. In the former case, however, the pressure difference between the inside and the outside does not vary with height and the adjoining line between the skin and the field is tight. In addition, the buoyant forces of the conventional pneumatic structures are mostly accumulated into heavy force on the surrounding edge part of the skin. Therefore, the stress borne by each component increases as the size of the structure increases; as a result, the range of structure and the volume formed thereof are limited by these factors and difficult to be large.

Conventionally, artificial rain technique uses aircraft or rocket to disseminate silver iodide or dry ice capable of producing ice forming nuclei into clouds to increase rainfall, or burns silver iodide on the ground and discharges the smoke with silver iodide particles into the updraft of a front when the front comes. In general, the aforementioned artificial rain technique can make the super-cooled water droplets of below −5° C. quickly freezing into ice crystals and releasing latent heat and thereby developing clouds and achieving an effect of increasing approximately 10% of rainfall. However, the conventional artificial rain technique needs synchronization of weather conditions; that is, the conventional artificial rain technique may not achieve the expected effect if there is no heavy cloud or front etc. coming. For example, cloud or front may not appear at the area suffering long-term drought; therefore, the conventional artificial rain technique may not be effective for relieving drought due to that the conventional artificial rain technique cannot actively promote the occurrence of heavy clouds and fronts. In addition, target of the conventional artificial rain technique is mesoscale cloud (having a horizontal width about ten kilometers to hundreds of kilometers); that is, the conventional artificial rain technique is adapted for a large area.

Another conventional artificial rain technique is that: based on meteorology document, a large area of forest fire or a violent house fire may lead to local rainfall due to that fire may release a huge amount of thermal energy to the lower atmosphere, and thereby increasing the atmospheric instability in the local region. Therefore, convective cells lifting from lower atmosphere may develop into cumulonimbus and rainfall when violent fire and slightly more unstable weather condition occur simultaneously. Weather experts had attempted to adopt the means of the large scale of burning on the ground to increase thermal energy in the lower atmosphere thereby promoting rainfall; however, a large scale of burning is not only uneconomical but would also cause environmental pollution and disasters. Therefore, the conventional artificial rain technique is no longer developed and executed.

SUMMARY OF THE INVENTION

One objective of the present invention is to provide a covering for promoting local rainfall.

Another objective of the present invention is to provide a method for promoting local rainfall.

The present invention provides a covering for promoting local rainfall. The covering is for covering a field that can get thermal energy. A space for accommodating air can be formed between the covering and the field. Because the air covered by the covering receives thermal energy, and a skin of the covering prevents the air covered by the covering from mixing and convecting with the air outside the covering and thereby reducing a transmission of the thermal energy to the outside of the covering and making the temperature of air on the inside to be higher than that on the outside so as to generate buoyancy. Buoyancy generated by the air temperature difference is utilized to lift up the liftable portion of the skin within the edge part of the covering to form the space for accommodating air and accumulating thermal energy in the air in the space. The hot air covered by the covering can be released to increase the local atmospheric instability and stimulate the occurrence of the local rainfall.

The covering at least comprises an anti-buoyancy apparatus and a skin mentioned above.

The skin is at least comprised of a broad thin object capable of substantially preventing the air covered by the covering from mixing and convecting with the air outside the covering and having a strength sufficient to bear an estimated stress caused by a buoyancy of hot air covered by the covering. The skin covers the field that can get thermal energy. During a period of time from a start of storing air until being filled up with air, an edge part of the skin is substantially maintained at an original height at or close to a surface of the field; meanwhile, a portion of the skin within the edge part can be lifted up away from the surface of the field so that a huge space for accommodating air can be formed between the skin and the surface of the field. A gap between the edge part of the skin and the surface of the field is utilized as an air inlet for the outside air to enter the space. Thus, the outside air can enter the space through the air inlet when the skin is being lifted up. According to the actual requirements, the covering may further comprise a tube capable of communicating with both sides of the covering, which is installed through a lower part of the skin or disposed below the edge part of the skin to be used as an air inlet for outside air to enter the space, or comprise a stacked-up object which is disposed under the edge part of the skin to form a gap between the edge part of the skin and the surface of the field to be used as an air inlet for outside air to enter the space.

The anti-buoyancy apparatus comprises a plurality of anchor members and a plurality of anti-buoyancy pulling members. The anti-buoyancy pulling members are distributed in a scattered arrangement below a liftable portion of the skin within the edge part. The anchor members are fixing in or placed on the field in a scattered manner. An upper end of each of the anti-buoyancy pulling members is connected to a respective portion of the skin and a lower end thereof is connected to the respective anchor member. Each of the anti-buoyancy pulling members is for transmitting tensile force between the respective portion of the skin and the respective anchoring member; wherein the tensile strength of the anti-buoyancy pulling members can bear an estimated stress caused by the buoyancy of the hot air covered by the covering. The anchoring members are the objects which can be connected for being exerted an upper force and are fixed in the ground or fixed in other objects on the ground which have sufficient fixing force for withstanding the buoyancy of hot air covered by the covering, or the objects placed on the ground or placed on other objects on the ground which have sufficient gravity for withstanding the buoyancy of hot air covered by the covering.

The thermal energy received by the air covered by the covering can be one or several types of energy, e.g.: solar radiation heat, geothermal heat, heat released from the ground or water surface, or industrial waste heat, etc., but the present invention is not limited thereto. The thermal energy received by the air covered by the covering can transmit through one or more routes listed hereinafter: transmitting in through the skin, transmitting in through the covered surface of the field or transmitting in through additionally installed pipe, etc., but the present invention is not limited thereto.

By the covering capable of getting thermal energy to heat up the air covered by the covering and preventing the air covered by the covering from mixing and convecting with the air outside the covering, the temperature of the inside air would be higher than the temperature of the outside air. Therefore, in addition to the thermal energy accumulating in the covered air, a temperature difference is created between the air inside the skin and the air outside the skin and buoyancy is generated to lift up the skin to enlarge the space and accumulate more thermal energy in the space. Referring to the theory in fluid mechanics, the buoyancy on any part of the skin generated by the hot air covered is proportional to both the temperature difference between inside and outside of the skin and the heights of the part of the skin measured from the air inlet. When the present invention is at the initial stage of thermal energy reception, in order to enable that the inner portion of the skin can be lifted up by the buoyancy of the hot air contained thereunder, the present invented covering can be required that to make at least a portion of the skin protruded and higher than air inlet to achieve a sufficient difference in height so as to form a protruded part of the "initiating bulge". Thus, by means of both the air covered by the covering continues to receive thermal energy and the skin isolates the internal thermal energy from dissipating to the outside so that the temperature difference is created and the buoyancy on the protruded part generated by the temperature difference can be greater than the gravity of the protruded part, and therefore the buoyancy would start to lift up the protruded part. For acquiring such a difference in height, it can be calculated by the following formula (1), or be obtained by a practical experiment.

Let the buoyancy greater than the gravity:

$$H \times \Delta T \times C > \Delta W / \Delta A$$

$$H > \Delta W / (C \times \Delta A \times \Delta T) \tag{1}$$

wherein H denotes the height difference (m) between the protruded part of the skin and the air inlet; $\Delta W$ denotes the weight (kg) of the protruded part of the skin including the part of the components connected therewith and pulled away from the covered surface; $\Delta A$ denotes the vertical projected area (m$^2$) of the protruded part of the skin on the horizontal plane; $\Delta T$ denotes the temperature difference (° C.) between the air inside the covering and the surrounding air; and C denotes the coefficient of buoyancy to air temperature difference (kg/m$^3$-° C.).

According to the law of Boyle and Charles, the aforementioned coefficient of buoyancy to air temperature difference C is correlated with the local air temperature and atmospheric pressure as the following formula (2):

$$C = 0.348 P / [(273+T) \times (273+T+\Delta T)] \tag{2}$$

wherein T denotes the surrounding air temperature (° C.) when such a covering is in use; and P denotes the surrounding atmospheric pressure (mb) when such a covering is in use.

In order to make the skin to form the protruded part of the "initiating bulge", it can be achieved by spreading the skin on the relatively protruding ground or on the relatively protruding existing plants or structure on the ground, which has a top height higher than the required height to form the protruded part of the "initiating bulge", or by installing an additional propping object or lifting equipment on the field to lift a portion of the skin higher than the required height, and thereby forming the protruded part of the "initiating bulge".

When the covered air receives thermal energy and increases temperature and makes the protruded part of the skin satisfying the requirement stipulated by the above formula (1) (that is, when the buoyancy at the protruded part of the skin is greater than the gravity of the protruded part), the protruded part starts to be lifted up, and the outside air is sucked through air inlet and the gap between the surface of the field and the skin from outside of air inlet to the space below the protruded part, and thereby filling the enlarged space resulted from the uplifting of the protruded part. The aforementioned gap utilizes the gap formed by spreading the skin on an uneven ground or/and the existing objects (such as short weeds or/and low structure etc.) on the ground and the anti-buoyancy pulling members and the strengthening members disposed under the skin etc., which prop up part of the skin from the covered ground. The gap enables the space under the protruded part of the skin to communicate with at least one air inlet.

After the protruded part of the skin starts to be lifted up, the covered air continues receiving thermal energy thereby the protruded part continues to be lifted up higher and its range becomes wider, meanwhile, the outside air continues to be sucked into the space below the covering, until all of the liftable portion of the skin to be lifted up to the heights pre-established by a plurality of respective anti-buoyancy pulling members and pulled by them, thereby the space between the covering and the field is completely filled with "initial heated" air. After the covering is completely filled with the "initial heated" air, the covered air further receives thermal energy to further increase the temperature of the covered air. When the air covered receives thermal energy and increases its temperature, meanwhile the water contained in the field below the covering also receives thermal energy and evaporates into vapor with latent heat and accumulates in the covered air, after a period of receiving thermal energy, eventually the covered air becomes "hot" air that is hot and humid.

After a huge amount of "hot" air is accumulated, the "hot" air covered can be released by loosening or untying off at least one of the anti-buoyancy pulling members so as to allow the covered "hot" air to lift up the skin to form an opening at the edge part of the skin; and thus, the covered "hot" air can flow through the opening and be released into the lower atmosphere so as to increase the temperature and humidity of the lower atmosphere of the local area.

In one embodiment of the present invention, the skin is composed of a broad thin object and a plurality of strengthening members.

In one embodiment of the present invention, at least a portion of the broad thin object of the skin is transparent.

In one embodiment of the present invention, further comprises at least one air discharge opening is installed inside the skin of the covering. During the period when air is stored, the edge part of the skin on the periphery of the air discharge opening continues to be substantially kept at the original height of the covered surface in a way similar to the above mentioned installation method of the edge part on the periphery of the skin. When it is desired for the hot air covered by the covering to be released, the anti-buoyancy pulling members near the air discharge opening can be loosened or untied so as to allow the buoyancy of the hot air covered by the covering to lift up an edge part of the air discharge opening and the nearby portion of the skin and thereby forming an air discharge opening for releasing the hot air covered.

In one embodiment of the present invention, the aforementioned covering further comprises a plurality of reinforcing members.

In one embodiment of the present invention, the aforementioned broad thin object is a plastic film or a film made of similar material (e.g., rubber or synthetic rubber or the like), or is the aforementioned plastic film or film made of material with similar characteristic reinforced with fibers, filaments, fabrics or a combination thereof.

The present invention further provides a method for promoting local rainfall comprising steps as follow.

Step 1, using one or a plurality of nearby aforementioned covering for promoting local rainfall to cover a field that can get thermal energy.

Step 2, spreading the skin of the covering on the surface of the field, managing to make a portion of skin protrudent higher than the air inlet achieving a sufficient difference in height to form a protruded part of the "initiating bulge" and by means of the air covered by the skin to receive thermal energy to increase the temperature difference between the air inside the skin and the air outside the skin, when the buoyancy of the air covered by the covering at the protruded part is greater than gravity of the protruded part, the buoyancy of the air covered by the covering starting to lift up the protruded part and sucking the air outside the covering into the space below the covering through the air inlet to fill an enlarged space resulted from the uplifting of the skin.

Step 3, receiving thermal energy by the covered air continuously, thereby the protruded part continuing to be lifted up higher and wider, meanwhile the air outside the covering continuing to be sucked into the space below the covering, until all of the liftable portion of the skin being lifted up to the heights pre-established by a plurality of respective anti-buoyancy pulling members, so that the space below the covering is completely filled with the "initial heated" air.

Step 4, receiving thermal energy by the covered air further continuously, thereby the temperature of the covered air being raised. Meanwhile the water contained in the field below the covering also receiving thermal energy and being evaporated into vapor with latent heat accumulates in the covered air, through a period of receiving thermal energy the covered air becomes "hot" air that is hot and humid.

Step 5, after a huge amount of thermal energy is accumulated in the covered air, the air is released into the lower atmosphere at a proper time thereby increasing the temperature and humidity of the lower atmosphere so as to increase the local atmospheric instability and to promote the occurrence of "small" scale cumulonimbus and rain.

In one embodiment of the present invention, the process of making a portion of the skin to form the protruded part of the "initiating bulge" comprises: acquiring the required height of the protruded part either by practical experiments or by calculating base on the after-mentioned formula (1) in advance, then surveying the actual height of the protruded part of the skin spreaded on the field and discriminating whether the actual height of the protruded part is higher than the required height or not. If the consequence of the discrimination is yes, the protruded part of the skin can be utilized as the protruded part of the "initiating bulge". If the consequence of the discrimination is no, an additional height increasing object, such as a framework, or other lifting equipments with similar effect, is needed to be installed on the field to lift up a portion of the skin higher than the required height, thereby forming the protruded part of the "initiating bulge".

The method of releasing the air covered by the covering comprises: loosening or untying at least one of the anti-buoyancy pulling members.

In one embodiment of the present invention, the aforementioned method for promoting local rainfall further comprises: adding ice forming nuclei and/or condensation nuclei into the air covered by the covering before releasing the air covered by the covering.

In one embodiment of the present invention, the means of adding ice forming nuclei and/or condensation nuclei comprises: (1) discharging the smoke of burned silver iodide into the covered hot air; and/or (2) spraying fine droplets of saline water solution into the covered hot air.

In the present invention, the method for promoting local rainfall utilizes at least one covering for promoting local rainfall to cover a large area of field where can get thermal energy. After the aforementioned five steps are performed, a huge amount of renewable thermal energy from large area of field is received and accumulated in a huge volume of air covered by the covering and to release into the lower atmosphere for increasing the atmospheric instability and the probability of rainfall in local region. Especially, when the weather is in unstable condition, releasing such a huge amount of hot and humid air into the lower atmosphere will enhance the weather becoming more unstable, i.e. will promote the occurrence of "small" scale cumulonimbus and rain and thus, this invention can be utilized to efficiently promote local rainfall.

BRIEF DESCRIPTION OF THE DRAWINGS

Other advantages, objectives and features of the present invention will become apparent from the following description referring to the attached drawings.

FIG. 8 is a flowchart of a method for promoting local rainfall in accordance with a preferred embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In order to improve the artificial rain technology, the present invention provides means for increasing the temperature and humidity in the lower atmosphere, i.e. to increase local atmospheric instability so as to form small-scale cumulonimbus (with a horizontal width ranged from 0.5 to 10 km) in the troposphere and to promote local rainfall. The method of the present invention requires covering a huge amount of air in a field, then getting thermal energy to heat up the covered air and preventing the covered air from mixing and convecting with the outside air so as to accumulate thermal energy in the covered air. After a huge amount of thermal energy is accumulated in the covered air, the covered air is released to the lower atmosphere to increase the temperature and humidity in the lower atmosphere, so as to promote the formation of "small" scale cumulonimbus and to increase the probability of rainfall. The method, as mentioned above, utilizes the covering as a device for covering a field, accommodating air, and receiving and accumulating thermal energy. In order to make the covering to have larger area size and certain height so as to receive and accumulate a huge amount of thermal energy in the huge volume of covered air, the present invention utilizes the buoyancy generated by the temperature difference between inside and outside of a skin of the covering to lift up the skin and form a huge space, instead of utilizing bulky components such as boards, beams and columns to support a structural body as in the prior art. In addition, the present invention utilizes a plurality of anti-buoyancy pulling members distributed in a scattered arrangement below the covering; each of which to counteract the extra buoyant force over the gravity of the covering on the spot of the respective portion of the covering after the covering is completely filled with hot air, preventing the buoyant force from accumulated into heavy force on the edge part and limited the size of the covering as the condition in the prior art of the conventional pneumatic structure. Therefore, not only the covering can be made to have larger area size and certain height, but also the stress on the skin of the covering is greatly reduced, such that thickness and weight of a broad thin object of the skin can be reduced when the stress on the skin of the covering is within a range of allowable stress of the material of the covering, and the covering can easily satisfy the formula (1) (will be described later) to form a protruded part of an "initiating bulge" for lifting up the skin and sucking the outside air into the space below the covering when the covering is at the initial stage of thermal energy reception. The thickness of the broad thin object of the skin used in present invention is in a range of about 0.03 mm to 2.0 mm, but the present invention is not limited thereto. Following the covered air is continuously receiving thermal energy, the skin continues to be lifted up and the outside air continues to be sucked into the space below the covering. After the covering is completely filled with air, the covered air further continuously receives thermal energy, therefore the temperature of the covered air also continuously rises, and eventually the buoyancy on the skin is much larger than the gravity of the skin. In order to balance these forces, the anti-buoyancy pulling members which are distributed in a scattered arrangement below the covering are utilized to withstand the extra buoyancy over the gravity of the covering on the spot of respective portion of the covering, such that the stress on the skin is reduced and the skin can be made thin and light and the skin would not be damaged by the buoyancy of huge volume of hot air covered below the covering, therefore the covering of this invention could be made into huge structure to accommodate huge volume of hot air. A huge amount of thermal energy is accumulated in the covered air after the covering has been completely filled with air and continues to receive thermal energy. The length (or width) of a single covering, for example, is about 200 m to 5 km, but the present invention is not limited thereto, and the length (or width) of the filed on which a plurality of coverings are installed nearby one another, for example, is about 500 m to 20 km or even larger. The height of the covering when completely filled with air is about 5 m to 150 m.

The covering for promoting local rainfall of the present invention is installed on a field where can get thermal energy. The surface of the filed may be a ground or a portion of ground and a portion of water surface, in which the ground may be a flat ground or a ground with small undulation. In order to facilitate the assembly of the components of the covering such as the skin, preferably the ground has no any object thereon or has only a limited height of aboveground objects thereon such as the existing plants or/and structures. If there are some places of ground or/and aboveground object within the edge part (i.e. the inner portion) of the field relatively protrudes, preferably the height of the relatively protruding ground or the aboveground object shall not be over or close to the designed height of the corresponding portion of the skin; otherwise, the relatively protruding ground or the aboveground object must be shaped or removed before the installation of the covering. In addition, the ground under the edge part of the skin, is preferably more flat or has no aboveground object or has but low aboveground object; otherwise following process must be treated; to move the location of edge part away to a nearby suitable place, or to cut the top part of the aboveground object, or to excavate the high projecting portion of the ground, etc.

Figure 1:
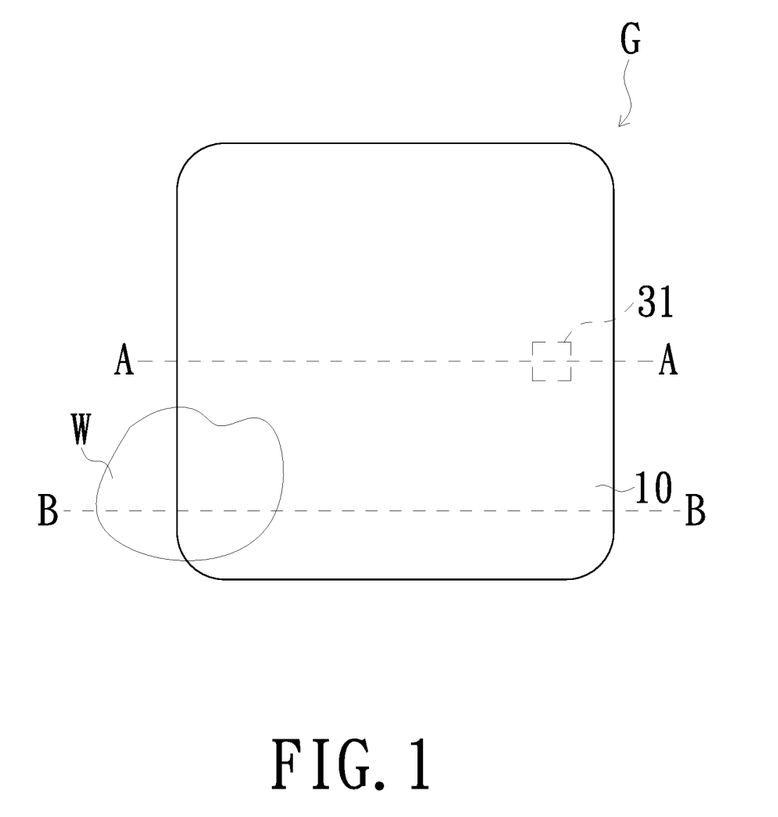
FIG. 1 is a schematic top view of a covering for promoting local rainfall in accordance with a preferred embodiment of the present invention.
Figure 2:
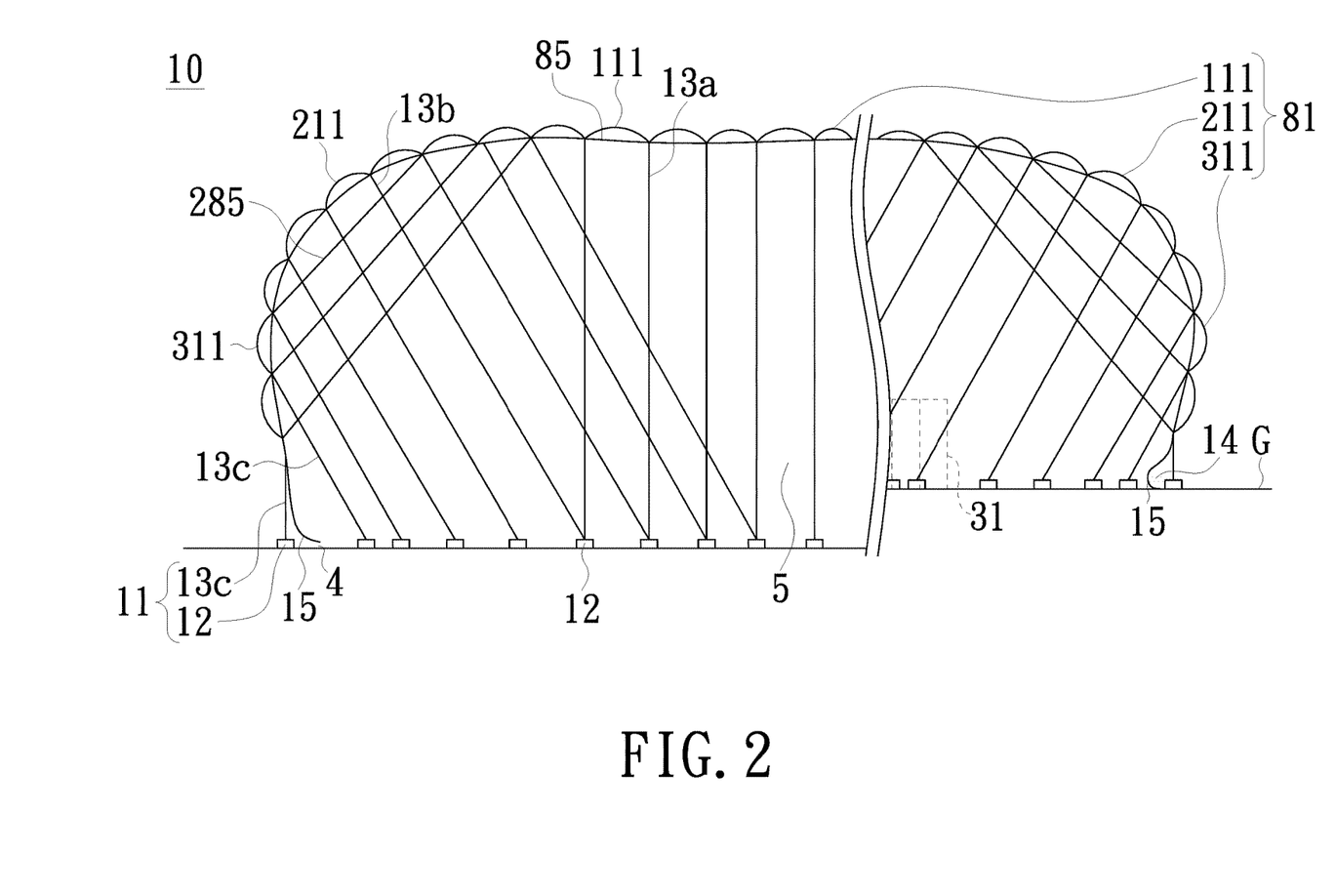
FIG. 2 is a schematic vertical cross-sectional enlarged view of a portion of the covering, taken along the line A-A in FIG. 1, when the covering is applied to an uneven field and is completely filled with air.
Figure 3A:
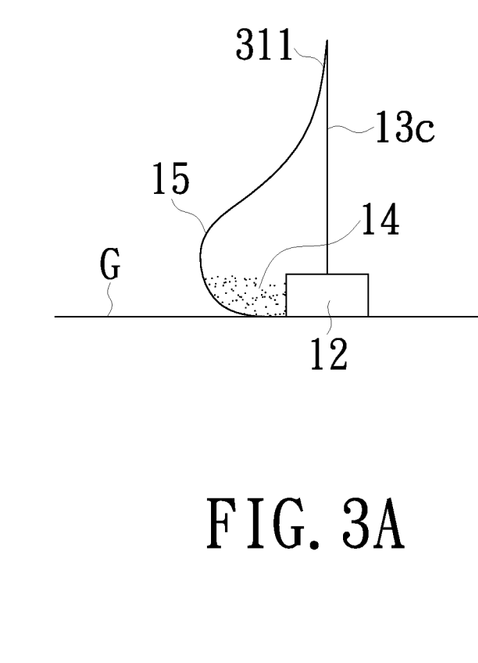
FIG. 3A is a schematic enlarged vertical sectional view of a portion of an edge part of a skin located at a part of higher ground in the case of FIG. 2.
Figure 3B:
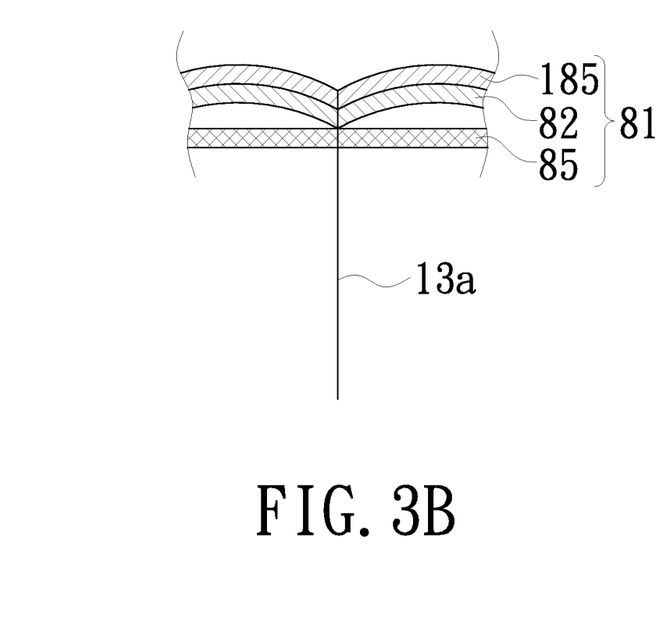
FIG. 3B is a schematic enlarged view of a portion of a top part of the skin in FIG. 2.

FIG. 1 is a schematic top view of a covering for promoting local rainfall in accordance with a preferred embodiment of the present invention. FIG. 2 is a schematic vertical cross-sectional enlarged view of a portion of the covering, taken along the line A-A in FIG. 1, when the covering is applied to an uneven field and is completely filled with air. FIG. 3A is a schematic enlarged vertical sectional view of a portion of an edge part of a skin located at a part of higher ground in the case of FIG. 2. FIG. 3B is a schematic enlarged view of a portion of a top part of the skin in FIG. 2. Please refer to FIGS. 1 and 2 together. The covering 10 for promoting local rainfall in one embodiment of the present invention is used to cover a surface of a field where can get thermal energy; wherein the surface of the field comprises a part of ground G and a part of water surface W. In another embodiment, the surface of the field is ground G only without the water surface W. The covering 10 comprises a skin 81 and an anti-buoyancy apparatus 11. By substantially maintaining an edge part 15 of the skin 81 at an original height at or close to the surface of the field (the ground G and the water surface W), a space 5 for accommodating air is formed between the skin 81 and the surface of the field (the ground G and the water surface W) by lifting up a top part 111, an inclination changing part 211 and a side part 311 of the skin 81. If the ground G is uneven or a short aboveground object exists at the ground G and therefore a gap is formed between the edge part 15 of the skin 81 and the surface of the field, the gap may be utilized as an air inlet 4. However, the air inlet 4 should not be installed at the place of too high ground under edge part compare to other places of ground under edge part; and instead, in order to increase air tightness, a sealing object 14 can be installed to seal the gap formed between the higher ground and the edge part 15 of the skin 81 thereon. For example, soil or other similar object with weight is exemplarily utilized as the sealing object 14 to press down the edge part 15 of the skin 81 to achieve the effect of seal, as illustrated in FIG. 3A. The edge part 15 is immersed in water when the edge part 15 is disposed at the water surface W, and therefore, no gap utilized as the air inlet 4 is formed here. However, it is understood that the air inlet 4 is not necessary to be installed at the water surface W as long as the ground G has the air inlet 4. If it is necessary to install the air inlet 4 at the water surface W, a pipe (will be described in conjunction with FIG. 5B) or a stacked-up object (will be described in conjunction with FIG. 5C) may be installed additionally to replace the air inlet 4 for communicating the inside and outside of the covering 10. The anti-buoyancy apparatus 11 comprises a plurality of anchor members 12 and a plurality of distributed anti-buoyancy pulling members 13a, 13b and 13c. The upper end of each of the anti-buoyancy pulling members 13a, 13b and 13c is connected to the respective portion of the skin 81 and the lower end thereof is connected to the respective anchor member 12 installed in the field. By continuing receiving thermal energy, the temperature of the air in the space 5 rises and is higher than the temperature of the outside air; and therefore, the buoyancy against the skin 81 is generated. Further, through a sufficient height difference, the buoyancy is strong enough to lift up the top part 111, the inclination changing part 211 and the side part 311 of the skin 81 and thereby enlarging the space 5 and sucking the outside air into the space 5 and fill the enlarged space resulted from the uplifting of the skin 81. By further continuing receiving thermal energy, the air covered continues to lift up the skin 81 until reaches the pre-established heights of the anti-buoyancy pulling members 13a, 13b and 13c. As a result, the space 5 formed between the covering 10 and the surface of the field (the ground G and the water surface W) is completely filled with air. By still further continuing receiving thermal energy, the temperature of the huge volume of air covered in the space 5 keeps rising and more thermal energy is accumulated in the covered air.

As shown in FIG. 2, the strength of the skin 81 of the covering 10 is designed to have a strength sufficient to withstand the estimated stress caused by the buoyancy of the covered hot air. In addition, a broad thin object 82 (in FIG. 3B) of the skin 81 can substantially prevent the air in the space 5 from passing through the skin 81 and mixing with the outside air. At least a portion of the broad thin object 82 is transparent, so that sunlight can emit into and heat the covered air. The broad thin object 82 may be a plastic film or a film made of other materials having the aforementioned characteristics. For example, the broad thin object 82 may be a film made of polyethylene (PE), ethylene vinyl acetate copolymer (EVA), polyvinyl chloride (PVC), polypropylene (PP), polyethylene terephthalate (PET) or a film made of other materials with similar characteristics, such as a rubber film, a synthetic rubber film, or a combination thereof. In addition, fiber, thread, braided fabric or a combination thereof may be added into the aforementioned plastic film or film made of material with similar characteristics to enhance structural strength.

By further continuing receiving thermal energy after the covering 10 is completely filled with air, the temperature of the covered air keeps rising and the buoyancy of the covered air is larger than the gravity of the skin 81. The parts of buoyancy of the covered air over the gravity of the skin 81 are borne by the anti-buoyancy pulling members 13a, 13b, 13c, respectively, then counteracted by the anchor members 12. The anchor members 12 are fixed to or placed on the field. Each of the anchor members 12 is connected to one or a plurality of anti-buoyancy pulling members and capable of withstanding the upward force therefrom. In the example of the anchor member 12 being fixed to the field is a pile, plant or structure fixed to the ground G or the bottom of water or any object fixed to the field. In the example of the anchor member 12 being placed on the field is a solid object of sufficient weight, such as concrete, stone, metal, wood or a combination thereof, or is a container (such as a bag, basket or bucket, etc.) contained with sufficient weight of object (such as soil, etc.) or the combination thereof placed on the ground G or the bottom of water. In the embodiment shown in FIG. 2, the anchor members 12 are piles fixed to the ground G and the bottom of the water; and each of the anchor members 12 is connected to one or a plurality of anti-buoyancy pulling members 13a, 13b or 13c to withstand the part of the buoyancy over the gravity of the skin 81 when the temperature of the air in the space 5 keeps rising after the space 5 is completely filled with air.

The anti-buoyancy pulling members 13a, 13b and 13c of the covering 10 are members for transmitting the tensile force between the skin 81 and the anchor members 12 and have strengths can bear an estimated stress caused by the buoyancy of the covered hot air. The anti-buoyancy pulling members 13a, 13b and 13c may be made of members capable of transmitting tensile force and the material of which may be natural material, synthetic material or a combination thereof. In the embodiment in FIG. 2, each of the anti-buoyancy pulling members 13a is connected to the top part 111; each of the anti-buoyancy pulling members 13b is connected to the inclination changing part 211; and each of the anti-buoyancy pulling members 13c is connected to the side part 311. The anti-buoyancy pulling member 13a is connected to the respective anchor members 12 downwardly in a substantially vertical direction, and accordingly the anchor member 12 can counteract the buoyancy on the top part 111. The anti-buoyancy pulling member 13b is connected to the respective anchor member 12 in an inclined direction inwardly and downwardly, and accordingly the anchor member 12 can counteract the horizontal and vertical component forces derived from the buoyancy on the inclination changing part 211 and would further avoid the horizontal and vertical component forces derived from the buoyancy on the inclination changing part 211 from transfers and accumulate to the side part 311 and the edge part 15 and damage the side part 311 and the edge part 15 due to over stress. The anti-buoyancy pulling member 13c is connected to the respective anchor member 12 in an inclined direction inwardly and downwardly, and accordingly the anchor member 12 can counteract the horizontal and vertical component forces derived from the buoyancy on the side part 311. Due to the arrangement of the anti-buoyancy pulling members as mentioned above, the stress of skin 81 is reduced thereby could avoid the damage of the covering 10.

The covering 10 may further comprise a plurality of reinforcing members 285 disposed inside the skin 81 and connected to the side parts 311 from the top parts 111 and the inclination changing parts 211 respectively, as shown in FIG. 2. The reinforcing member 285 is pulled tensely after the covering is filled with hot air, uses the horizontal component of its tensile force to reduce the stress of the skin 81 on the inclination part 211 and the side part 311 and the vertical component of its tensile force to assist to counteract the gravity of the side parts 311 and to pull away from the field surface. The material of the reinforcing member 285 may be synthetic material, natural material or a combination thereof.

The skin 81 of the covering 10 may further comprise a plurality of strengthening members 85 and 185, as shown in FIGS. 2 and 3B. The strengthening member 85 is disposed on the inside of the broad thin object 82 of the skin 81 and the strengthening member 185 is disposed on the outer surface of the broad thin object 82 of the skin 81, such that the tensile strength of the skin 81 is strengthened. The material of the strengthening members 85 and 185 may be synthetic material, natural material or a combination thereof.

In order to lift up the covering 10 and to suck the outside air into the space 5 below the covering 10 at the initial stage of thermal energy reception, estimation in advance of a required height of a protruded part for forming an "initiating bulge" measured from the air inlet 4 is required. The required height of the protruded part can be acquired either by practical experiments or by calculation base on following formula (1).

Let the buoyancy greater than the gravity:

$$H \times \Delta T \times C > \Delta W/\Delta A$$

$$H > \Delta W/(C \times \Delta A \times \Delta T) \quad (1)$$

wherein H denotes the height difference (m) between the protruded part of the skin 81 and the air inlet 4; $\Delta W$ denotes the weight (kg) of the protruded part of the skin 81 including the part of the components connected therewith and pulled away from the covered surface; $\Delta A$ denotes the vertical projected area (m$^2$) of the protruded part of the skin 81 on the horizontal plane; $\Delta T$ denotes the temperature difference (° C.) between the air inside the covering 10 and the surrounding air; and C denotes the coefficient of buoyancy to air temperature difference (kg/m$^3$-° C.).

According to the law of Boyle and Charles, the aforementioned coefficient of buoyancy to air temperature difference C is correlated with the local air temperature and atmospheric pressure as the following formula (2):

$$C = 0.348 P/[(273+T) \times (273+T+\Delta T)] \quad (2)$$

wherein T denotes the surrounding air temperature (° C.) when such a covering 10 is in use; and P denotes the surrounding atmospheric pressure (mb) when the covering 10 is in use.

After the required height is acquired, the surveying work is performed to know the actual height of the protruded part of the skin 81, then to discriminate whether the actual height thereof is higher than the required height thereof or not. If the consequence of the discrimination is yes, the protruded part of the skin 81 spread on the relatively protruded part of the ground G or spread on the aboveground object in the field is utilized as the protruded part of the "initiating bulge". If the consequence of the discrimination is no, an additional height increasing object 31, such as a framework, or other propping objects or lifting equipments, etc, with similar effect, is needed to install on the ground G in the field to lift a portion of the skin 81 higher than the required height. In the embodiment of FIG. 2, a framework is exemplarily utilized as the height increasing object 31 to lift up a portion of the skin 81 corresponding to the top part 111 and the inclination changing part 211 higher than the required height, and thereby forming the protruded part of the "initiating bulge".

Figure 4:
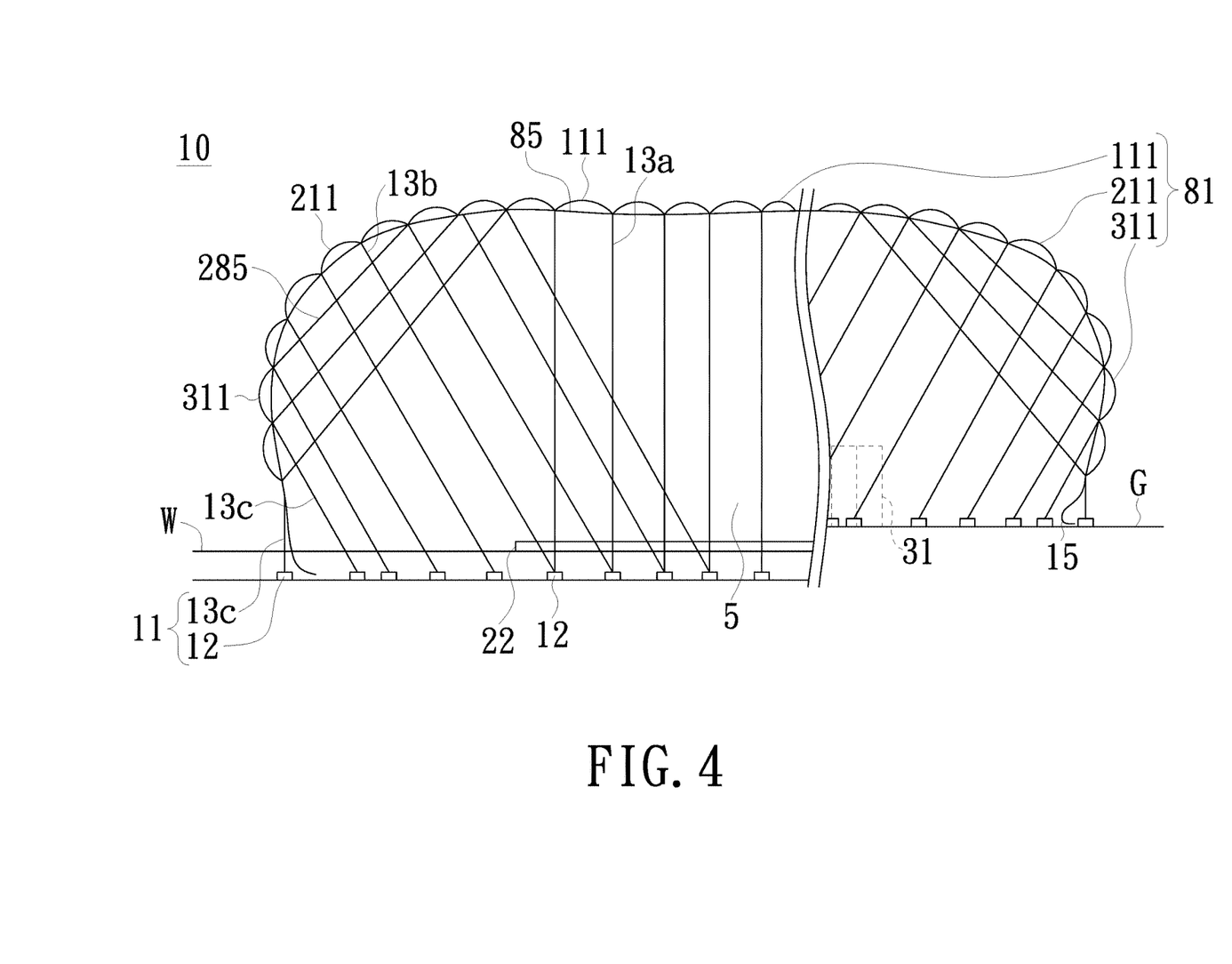
FIG. 4 is a schematic vertical cross-sectional enlarged view of a portion of the covering, taken along the line B-B in FIG. 1, in a case where the covered surface is partial ground and partial water surface, when the covering applies to a field is completed filled with air.
Figure 5A:
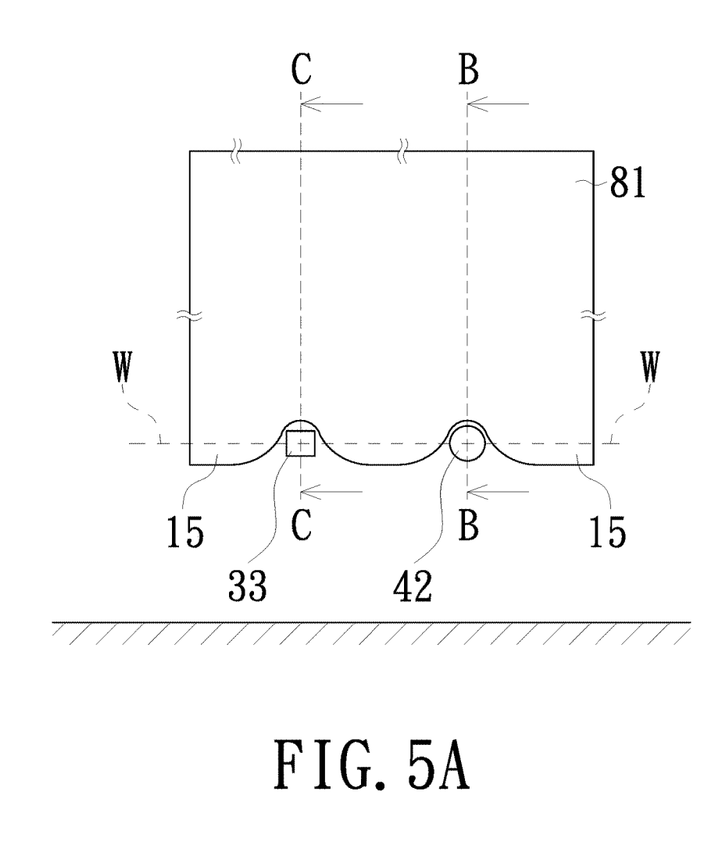
FIG. 5A is a schematic enlarged left-side view of a portion of the edge part of the skin located at the water part on the left-hand side of FIG. 4.
Figure 5B:
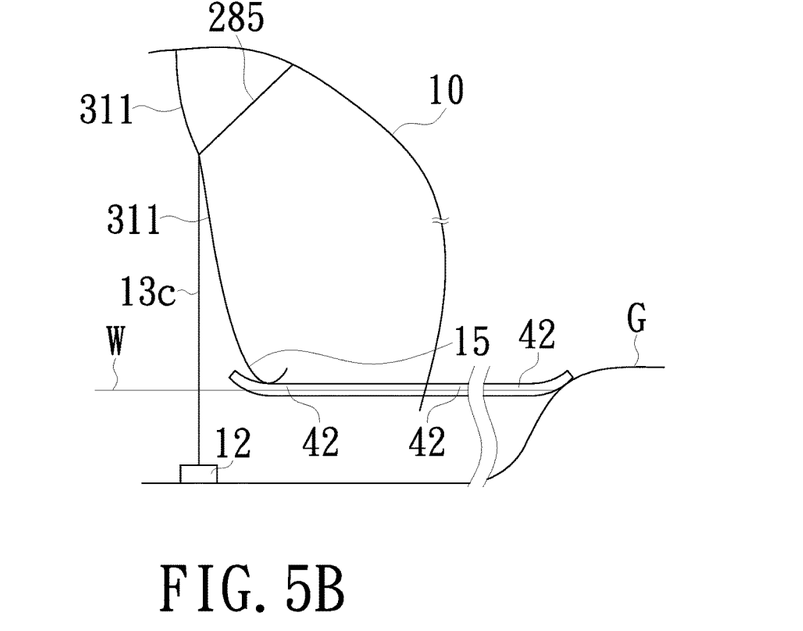
FIG. 5B is a schematic cross-sectional view taken along the line B-B in FIG. 5A.
Figure 5C:
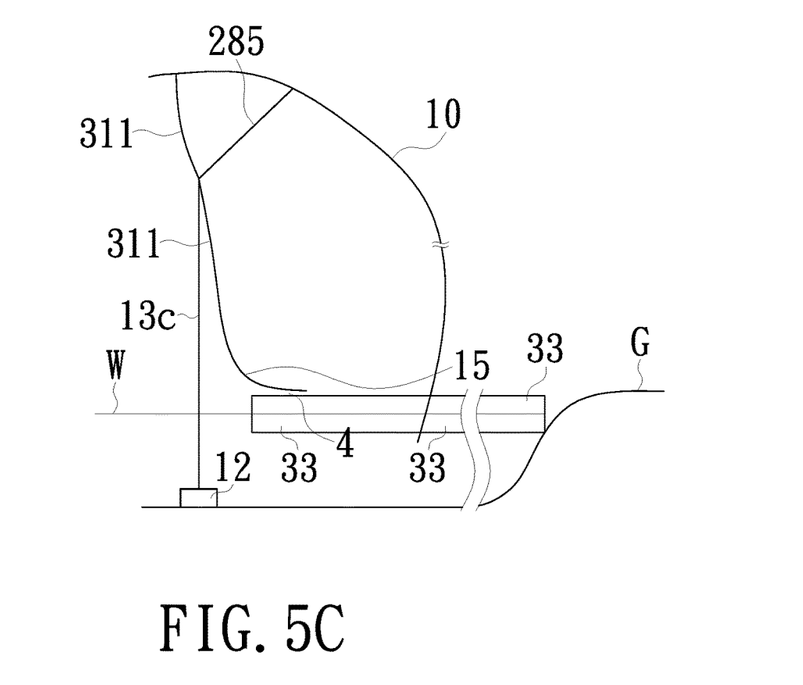
FIG. 5C is a schematic cross-sectional view taken along the line C-C in FIG. 5A.

As shown in FIGS. 4 and 5A, the edge part 15 as well as the nearby skin 81 is immersed in water when the edge part 15 is disposed at the water part, therefore, no gap can be utilized as the air inlet between the edge part 15 as well as the nearby skin 81 and the water surface W. If it is necessary to dispose the air inlet for communicating the inside and outside of the covering 10, a pipe or a stacked-up object may be selectively installed between a portion of water surface W and the skin 10 of the covering 10 to form the air inlet. In one embodiment as shown in FIG. 5B, a pipe 42 of an arbitrary length is additionally installed, in which the inlet end is located above the water surface w outside the covering 10 and extended inward through a place below the edge part 15 and the nearby skin 81 to the ground G inside the covering 10, and the outlet is located above the ground G; wherein a hollow part of the pipe 42 is utilized as the air inlet. In another embodiment as shown in FIG. 5C, a stacked-up object, such as a floatable stacked-up object 33 having its upper part exposed a short height from water (FIG. 5C) or a stacked-up object, either floatable or unfloatable one, having its bottom side placed on water bottom and its upper part exposed a short height from water (not shown in the figures), is additionally installed under a portion of the edge part 15 and the nearby skin 81 extending from the water part outside of the covering 10 inward to the ground G near the water part, in which the top part of the stacked up object propping up part of the edge part 15 as well as the nearby skin 81, and thereby forming a gap between the water surface W and the edge part 15 as well as the nearby skin 81; wherein the gap is utilized as the air inlet.

In case that the neighboring area of the field having industrial waste heat or geothermal heat, etc., is available, depending on the actual need, the covering 10 optionally can be further comprised a pipe (not shown in the figures) for transmitting thermal energy, so that the thermal energy such as industrial waste heat or geothermal heat can be transmitted from the neighboring area of the field to the inside of the skin 81 through a place below the edge part 15 of the skin 81.

In the embodiment of FIG. 4, an object 22, which is floatable on water and can reduce the transmission of sunshine, such as floatable wood or plant, plastic items with bubbles or other objects, can be additionally disposed on a portion or all of the water surface w except where other component of the covering is installed below the skin 81, to reduce the solar radiation heat transmitting into the water.

After a huge amount of thermal energy is accumulated in the air covered by the covering 10 of the present embodiment, at least one of the anti-buoyancy pulling members 13b and 13c close to the edge part 15 can be loosen or untied so as to allow the covered hot air to lift up the corresponding portion of the skin 81 (e.g., the inclination changing part 211 and the side part 311) and bring the neighboring portion of the edge part 15 to be lifted away from the surface of the field (e.g., the ground G, the water surface W), thereby forming an opening; and thus, the covered hot air can be released into the lower atmosphere through the opening. The anti-buoyancy pulling members 13a, 13b and 13c near the air discharge opening may be connected in up/down series with various types of fastener, ring or hook etc. components (not shown in the figures) then connected with the anchor members 12, so that the anti-buoyancy pulling members 13a, 13b and 13c can be detached from the anchor members 12 easily. Further, remote control detaching devices (not shown in the figures) may be disposed between the anchor members 12 and the anti-buoyancy pulling members 13a, 13b and 13c, so that, on a proper occasion when it is desired for the hot air covered to be released, each of the anti-buoyancy pulling members 13a, 13b and 13c can be simultaneously detached from the respective anchor members 12.

Figure 6:
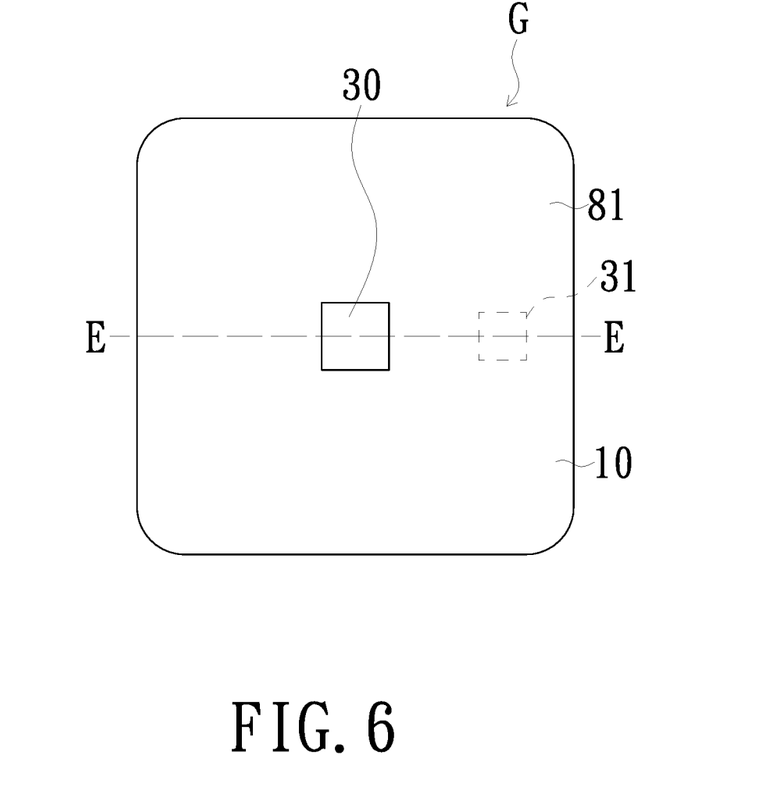
FIG. 6 is a schematic top view of a covering for promoting local rainfall in accordance with another preferred embodiment of the present invention.
Figure 7:
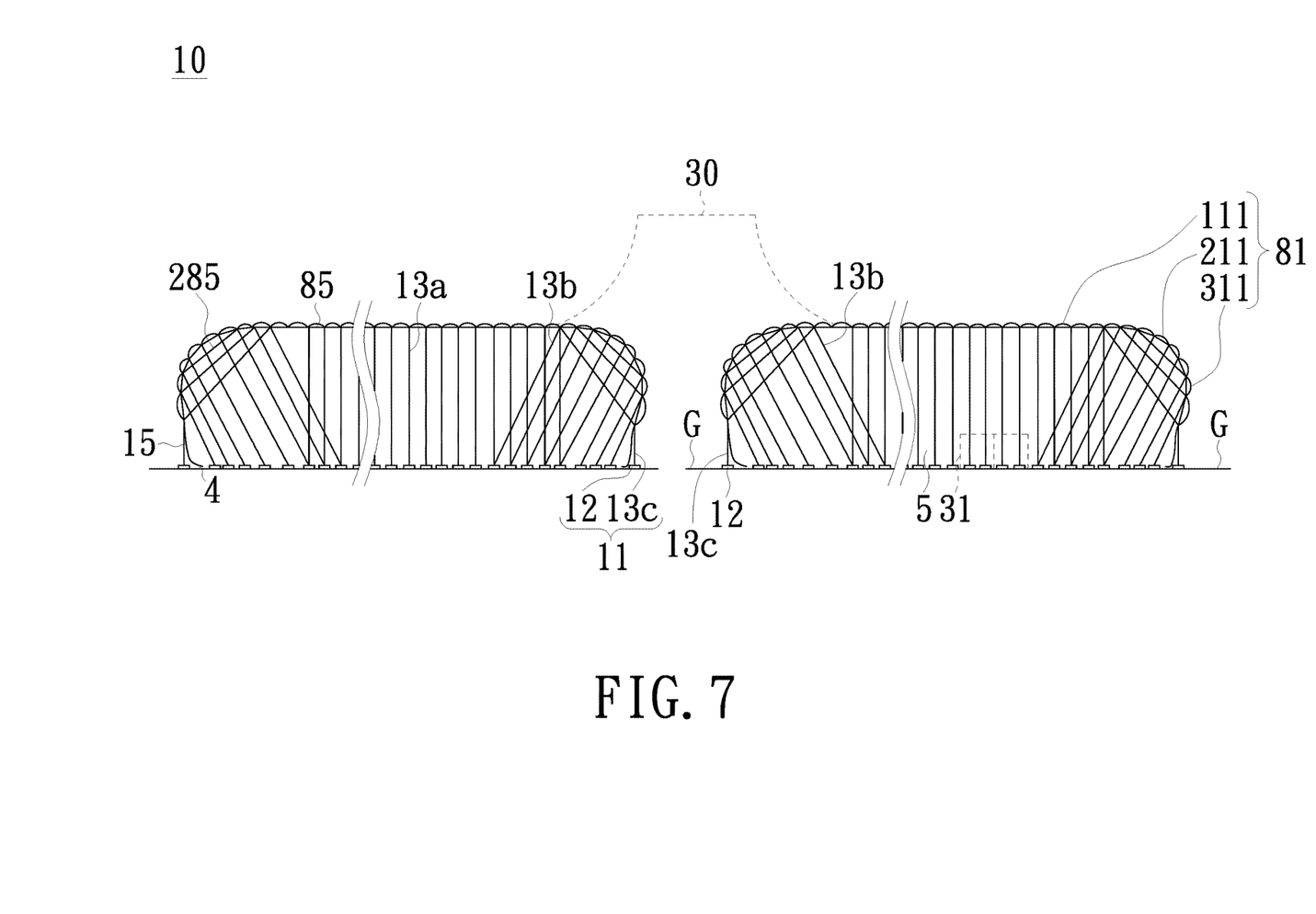
FIG. 7 is a schematic vertical cross-sectional enlarged view of a portion of the covering, taken along the line E-E in FIG. 6, when the covering is completely filled with air.

FIG. 6 is a schematic top view of a covering for promoting local rainfall in accordance with another preferred embodiment of the present invention. FIG. 7 is a schematic vertical cross-sectional enlarged view of a portion of the covering, taken along the line E-E in FIG. 6. Please refer to FIGS. 6 and 7 together. The covering 10 of the present embodiment further comprises at least one air discharge opening 30 installed inside the skin 81 of the covering 10. The dispositions of the edge part 15 of the skin 81 on the periphery of the air discharge opening 30 and the nearby anti-buoyancy pulling members 13b and 13c in FIGS. 6 and 7 are similar to those of the edge part 15 of the skin 81 of the covering 10 and the nearby anti-buoyancy pulling members 13b and 13c in FIGS. 1 and 2; that is, during the period when air is stored, the edge part 15 of the skin 81 on the periphery of the air discharge opening 30 and the nearby anti-buoyancy pulling members 13b and 13c continues to be substantially kept at the original height of the covered surface (e.g. the ground G water surface W) in a way similar to the above mentioned installation method of the edge part 15 of the skin 81 in FIGS. 1 and 2. When it is wanted for the hot air covered by the covering 10 to be released the anti-buoyancy pulling members 13b and 13c near the edge part 15 of the air discharge opening 30 can be loosened or untied so as to allow the covered hot air to lift up the corresponding portion of the skin 81 (e.g., the inclination changing part 211 and the side part 311) and bring the neighboring edge part 15 to be lifted away from the surface of the field (e.g., the ground G, the water surface W), thereby forming the air discharge opening 30; and thus, the covered hot air can be released into the lower atmosphere through the air discharge opening 30. In the embodiment of FIG. 6, except the disposition of the air discharge opening 30, the dispositions and components of the elements in FIGS. 6 and 7 are the same as those shown in FIGS. 1 and 2, and no redundant detail is to be given herein.

FIG. 8 is a flowchart of a method for promoting local rainfall in accordance with an embodiment of the present invention. As shown in FIG. 8, the method for promoting local rainfall of the present embodiment comprises steps as follow.

Step 801: using one or a plurality of nearby coverings for promoting local rainfall, each of which to cover the field where can get thermal energy.

Step 802: spreading the skin of the covering on the surface of the field, managing to make a portion of skin protrudent higher than the air inlet achieving a sufficient difference in height to form a protruded part of the "initiating bulge" and by means of the air covered by the skin to receive thermal energy to increase a temperature difference between the air inside the skin and the air outside the skin, when the buoyancy of the covered air at the protruded part to be greater than the gravity of the protruded part, the buoyancy of the covered air starting to lift up the protruded part and sucking the outside air into the space below the covering through an air inlet to fill an enlarged space resulted from the uplifting of the skin.

Step 803: receiving thermal energy by the covered air continuously, thereby the protruded part continuing to be lifted up higher and wider, meanwhile the air outside the covering continuing to be sucked into the space below the covering until all of the liftable portion of the skin being lifted up to the heights pre-established by a plurality of respective anti-buoyancy pulling members, so that the space between the covering and the field is completely filled with "initial heated" air.

Step 804, after the covering is completely filled with the "initial heat" air, receiving thermal energy by the covered air further continuously, thereby the temperature of the covered air being raised, meanwhile the water contained in the field below the covering also receiving thermal energy and being evaporated into vapor with latent heat accumulates in the covered air, through a period of receiving thermal energy the covered air becomes "hot" air that is hot and humid.

Step 805, after a huge amount of thermal energy is accumulated in the covered air, releasing the covered air to the lower atmosphere at a proper time thereby increasing the temperature and humidity of the lower atmosphere so as to increase the local atmospheric instability and promote the occurrence of small-scale cumulonimbus and rain. If more than one nearby coverings is utilized, the air covered by the plurality of nearby coverings is released to the lower atmosphere substantially simultaneously.

The method for promoting local rainfall of the present invention utilizes at least one covering for promoting local rainfall to cover a large area of field where can get thermal energy. After the aforementioned five steps are performed, the covering and the method of this invention can be utilized to receive a huge amount of renewable thermal energy from the large area of field and accumulate in the huge volume of air covered by the covering and to be utilized to release into the lower atmosphere for increasing the atmospheric instability and the probability of rainfall in local region. Especially, when the weather is in unstable condition, releasing such a huge amount of hot and humid air into the lower atmosphere will enhance the weather becoming more unstable, i.e. will promote the occurrence of small scale cumulonimbus and rain near the local region; and thus, this invention can be utilized to efficiently promote local rainfall.

If the covered field (e.g., the ground G) lacks of water, depending on the actual need, the method for promoting local rainfall optionally may further comprise supplying the field with water by any method, such as irrigation, sprinkle water, or spraying mist, etc. before or during the process of thermal energy reception, thereby moisturizing the field. And thus, water in the field also receives thermal energy and evaporates into vapor with latent heat accumulating in the covered air.

In step 802, in order to form the protruded part of the "initiating bulge" inside the skin of the covering, it is a good thing to be beforehand with the acquirement of the required height of the protruded part measured from the air inlet. It can be acquired either by practical experiments or by calculation base on the above mentioned formula (1). In the former case, the required height of the protruded part is obtained as follows: after the temperature of the covered air rises, lifting a portion of inner part of the skin (e.g., the top part and the inclination changing part) by equipment (e.g., forklift) or height increasing object (e.g., framework) to make a portion of the skin to be protruded until reaching at a height whereupon the skin of the protruded part starting to be floated up by the hot air, therefore the required height is acquired. In the latter case, the required height of the protruded part is calculated by the formula, for example, abovementioned formulae (1) and (2). The process is: at first, to take or measure the actual data from the field, such as the surrounding atmospheric pressure, the surrounding air temperature, the temperature difference between inside and outside of the covering after the covered air receives thermal energy, and weight per unit area of the protruded part of the skin including the part of the components, connected therewith and pulled away from the field surface. Next, to put the data taken from the field into formulae (2) and (1) to calculate out the height difference which is the required height measure from the air inlet. After the required height is acquired either by practical experiments or by the calculation base on the formulae, detection is performed to discriminate whether the height of the protruding part of the skin spreaded on a relatively protruding part of the ground or on an aboveground object in the field is higher than the required height. If the consequence of the discrimination is yes, the protruded part of the skin is utilized as the protruded part of the "initiating bulge". If the consequence of the discrimination is no, an additional height increasing object, such as framework or lifting equipment is needed to be installed on the field to lift a portion of the skin higher than the required height, and thereby forming the protruded part of the "initiating bulge".

In step 805, the process of releasing the covered hot air may be implemented by loosening or untying at least one of the anti-buoyancy pulling members of the covering so as to allow the covered hot air to lift up the corresponding portion of the skin (e.g., the inclination changing part and the side part) and bring the neighboring edge part to be lifted away from the surface of the field thereby forming the opening. In the embodiment of FIG. 2, for example, the left side of the edge part 15 is lifted away from the ground G to form the opening, and the covered hot air flows toward the left and is released into the lower atmosphere through the opening. In the embodiment of FIG. 7, for example, the anti-buoyancy pulling members 13b and 13c near the edge part 15 of the air discharge opening 30 can be loosened or untied so as to allow the covered hot air to lift up the corresponding portion of the skin 81 (e.g., the inclination changing part 211 and the side part 311) and bring the neighboring portion of its edge part 15 to lift away from the ground G, thereby forming the air discharge opening 30, and the covered hot air is released into the lower atmosphere through the air discharge opening 30. In addition, zippers (not shown) may be installed at the top part 111 and the inclination changing part 211. Therefore, when it is wanted for the hot air covered by the covering 10 to be released, the anti-buoyancy pulling members 13a and 13b close to the zippers are loosened so as to allow the corresponding portion of the skin 81 to raise higher and the tensile force thereon is increased; and eventually, the covered hot air is released when the zippers cannot withstand the enlarged tensile force and are unzipped. As to the opportunity of releasing of the covered hot air, whenever a huge amount of hot air is released into the lower atmosphere, it would be able to increase the atmospheric instability so as to increase the probability of rainfall. However, it would be more effective for promoting local rainfall to release the huge amount of hot air at the time of unstable weather. For example, between 12:00 midday and two hours before sunset is the time of unstable weather among the day due to the temperature and humidity of the surrounding air of the field at that time usually are raised to top of whole day by solar radiation. Alternatively, the timing of the release of the covered hot air may refer to the time of unstable weather reported by the meteorological agency.

Before releasing the covered hot air in step 805, the method for promoting local rainfall may further comprise adding ice forming nuclei and/or condensation nuclei into the covered hot air; for example: (1) burning silver iodide and discharging its smoke into the covered hot air and utilizing the iodide particles in the smoke as the ice forming nuclei suspended in the covered hot air; and/or (2) spraying fine droplets of saline water solution into the covered hot air and utilizing the residual salt particles as the condensation nuclei suspended in the covered hot air after the water contained in the fine droplets is evaporated in the covered hot air. Thus, when the ice forming nuclei and/or condensation nuclei carried by the hot air are released into the lower atmosphere with the hot air, which can enhance the vapor contained in the convection cells easier both to condense into droplets and to sublime into ice crystals in the cloud and release latent heat that would heat the cloud and thus further help lifting up and developing of the convection cells. In the prior art, silver iodide is burned on the ground but it is difficult to discharge the smoke of burned silver iodide into the updraft of the front accurately; on the contrary, the smoke of the burned silver iodide discharged into the covered hot air of this invention can be carried upward by the released hot air to form convection clouds contained with fine particles of silver iodide, therefore, it can promote the development of the convection clouds exactly.

Based on the above described embodiments, the covering and method for promoting local rainfall of the present invention has the following features.

1. Instead of utilizing bulky components such as boards, beams and columns to support the structural body as in the prior art, the present invention forms a huge space for storing hot air by utilizing renewable thermal energy to increase the temperature of the covered air and by utilizing buoyancy generated by the temperature difference between inside and outside of the covering to lift up the covering. In addition, the present invention utilizes a plurality of anti-buoyancy pulling members distributed in a scattered arrangement below the covering, each of which to directly counteract the extra buoyant force over the gravity of the covering on the spot of the respective portion of the covering and transmitted to the anchor members disposed in the field. Thus, the buoyancy would not accumulate from the top part to the edge part of the skin; and therefore, the covering can be made to larger in area and volume referring to the length and width of the field. Consequently, a huge amount of renewable thermal energy is accumulated in the huge volume of the covered hot air.

2. Instead of waiting for conditions such as heavy clouds or front to come to promote local rainfall, the present invention promotes local rainfall by releasing the huge amount of hot and humid air accumulated in the covering to the lower atmosphere to increase the temperature and humidity of the lower atmosphere i.e. to increase the atmospheric instability and the probability of rainfall in local region, even on a sunny day, the present invention can still promote local rainfall as long as enough renewable thermal energy is available, thereby achieving the effect of the relieving drought. Further, the present invention will not cause environmental pollution and disasters by utilizing renewable thermal energy.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for promoting local rainfall, comprising steps of:

using at least one covering for promoting local rainfall to cover a field that can get a thermal energy, wherein the covering for promoting local rainfall at least comprises a skin and an anti-buoyancy assembly, the skin is at least comprised of a broad thin object capable of substantially preventing an air covered by the skin of the covering from mixing and convecting with an air outside the skin of the covering and has a strength sufficient to bear an estimated stress caused by a buoyancy of hot air covered by the skin of the covering, the skin covering the field that can get the thermal energy, during a period of time from which air storage starts to a space for accommodating air between the skin and a surface of the field being filled up with air, an edge part of the skin is substantially maintained at an original height at or close to the surface of the field, meanwhile, a portion of the skin within the edge part can be lifted up away from the surface of the field so that the space for accommodating air can be formed between the skin and the surface of the field, a gap between the edge part of the skin and the surface of the field is utilized as an air inlet for the outside air to enter the space, and the anti-buoyancy assembly comprises a plurality of anchors and a plurality of anti-buoyancy connectors, the anti-buoyancy connectors are distributed in a scattered arrangement below the portion of the skin within the edge part, the anchors are fixed to or placed on the field in a scattered manner, an upper end of each of the anti-buoyancy connectors is connected to a respective portion of the skin and a lower end thereof is connected to the respective anchor, each of the anti-buoyancy connectors is for transmitting tensile force between the respective portion of the skin and the respective anchor, wherein tensile strength of the anti-buoyancy connectors can bear the estimated stress caused by the buoyancy of the hot air covered by the skin of the covering, the anchors are objects that can be connected for being exerted an upper force and are fixed to or placed on a ground or aboveground objects that have sufficient fixing force or gravity for withstanding the buoyancy of the hot air covered by the skin of the covering;

spreading the skin of the covering on the surface of the field, managing to make the portion of the skin within the edge part higher than the air inlet achieving a sufficient difference in height to form a protruded part of an initiating bulge, and utilizing the air covered by the skin of the covering to receive the thermal energy to increase a temperature difference between the air covered by the skin of the covering and the air outside the skin of the covering, wherein when the buoyancy of the air covered by the skin of the covering at the protruded part is greater than the gravity of the protruded part, the buoyancy of the air covered by the skin of the covering starts to lift up the protruded part, the space for accommodating air is enlarged resulted from uplifting of the skin, and the air outside the skin of the covering is sucked into the space for accommodating air through the air inlet to fill the space for accommodating air;

receiving the thermal energy by the air covered by the skin of the covering continuously, thereby the protruded part continuing to be lifted up higher and wider, wherein the air outside the skin of the covering continues to be sucked into the space for accommodating air until all of the portion of the skin within the edge part is lifted up to a height pre-established by the anti-buoyancy connectors, so that the space for accommodating air is completely filled with an initial heated air;

after the covering is completely filled with the initial heated air, continuing to receive the thermal energy by the air covered by the skin of the covering, thereby raising the temperature of the air covered by the skin of the covering, wherein a water contained in the field below the covering also receives the thermal energy and is evaporated into a vapor with the latent heat and accumulates in the air covered by the skin of the covering, after a period of reception of the thermal energy the air covered by the skin of the covering becomes the hot air that is hot and humid; and after a huge amount of the thermal energy is accumulated in the air covered by the skin of the covering, releasing the air covered by the skin of the covering to a lower atmosphere at a proper time thereby increasing a temperature and a humidity of the lower atmosphere so as to increase a local atmospheric instability and promote an occurrence of small-scale cumulonimbus and rain.

2. The method for promoting local rainfall according to claim 1, wherein the step of making a portion of the skin higher than the air inlet achieving a sufficient difference in height to form the protruded part of the initiating bulge further comprises: lifting up the portion of the skin within the edge part higher than a required height by an additional height increaser installed on the field, thereby causing the buoyancy of the air covered by the skin of the covering at the protruded part to be greater than the gravity of the protruded part.

3. The method for promoting local rainfall according to claim 1, wherein the step of releasing the air covered by the covering comprises: loosening or untying at least one of the anti-buoyancy connectors.

4. The method for promoting local rainfall according to claim 1, further comprising: adding ice forming nuclei and/or condensation nuclei into the air covered by the skin of the covering before releasing the air covered by the skin of the covering.

5. The method for promoting local rainfall according to claim 1, wherein at least a portion of the broad thin object of the skin is transparent.

6. The method for promoting local rainfall according to claim 1, wherein the skin is comprised of the broad thin object and a plurality of strengtheners.

7. The method for promoting local rainfall according to claim 1, wherein the covering for promoting local rainfall further comprises a plurality of reinforcements.

8. The method for promoting local rainfall according to claim 1, wherein the covering for promoting local rainfall further comprises a height increaser installed on the field for lifting up the portion of the skin higher than a required height, thereby forming the protruded part of the initiating bulge, so that the air covered by the skin of the covering receiving the thermal energy and the skin of the covering reducing the transmission of the thermal energy from the inside to the outside of the covering allow the air temperature difference between the two sides of the skin to increase and generate the buoyancy on the protruded part that is greater than the gravity of the protruded part and lifts up the protruded part of the skin and sucks the outside air into the space for accommodating air.

9. The method for promoting local rainfall according to claim 1, wherein at least one air discharge opening is installed inside the skin of the covering, wherein to release the air covered by the skin of the covering, the anti-buoyancy connectors near the air discharge opening are loosened or untied so as to allow the buoyancy of the air covered by the skin of the covering to lift up an edge part of the air discharge opening and a nearby portion of the skin, thereby forming the air discharge opening for releasing the air covered by the skin of the covering.

* * * * *